United States Patent [19]

Brennan

[11] Patent Number: 4,480,050

[45] Date of Patent: Oct. 30, 1984

[54] EXHAUST GAS OXIDATION CATALYST

[75] Inventor: John F. Brennan, Des Plaines, Ill.

[73] Assignee: UOP Inc., Des Plaines, Ill.

[21] Appl. No.: 555,227

[22] Filed: Nov. 25, 1983

Related U.S. Application Data

[63] Continuation-in-part of Ser. No. 404,160, Aug. 2, 1982, abandoned.

[51] Int. Cl.$^3$ .......................... B01J 21/04; B01J 23/58
[52] U.S. Cl. .................................. 502/330; 423/213.5
[58] Field of Search ....................... 502/330; 423/213.5

[56] References Cited

U.S. PATENT DOCUMENTS

| | | | |
|---|---|---|---|
| 3,306,944 | 2/1967 | Pollitzer | 502/330 |
| 3,839,224 | 10/1974 | Yonehara et al. | 502/66 |
| 3,928,238 | 12/1975 | Koberstein et al. | 502/241 |
| 3,931,050 | 1/1976 | Asano et al. | 502/303 |
| 4,171,289 | 10/1979 | Wheelock | 502/333 |
| 4,407,733 | 10/1983 | Birkenstock et al. | 502/330 |

*Primary Examiner*—W. J. Shine
*Attorney, Agent, or Firm*—William H. Page, II; Louis A. Morris

[57] ABSTRACT

The invention relates to an exhaust gas oxidation catalyst and a method of preparing the same. The method of the invention involves the impregnation of refractory inorganic oxide porous carrier material with an aqueous solution of a lithium salt of an organic acid in sufficient amount to result in a lithium content of from 0.1 to 0.8 wt. % based on the weight of the refractory inorganic oxide, prior to the impregnation of the carrier with catalytically active metallic compounds. The subject lithium impregnation results in a catalytic composite possessing higher oxidation activity and peripheral surface deposition of the catalytic metallic compounds.

8 Claims, No Drawings

EXHAUST GAS OXIDATION CATALYST

CROSS-REFERENCE TO RELATED APPLICATION

This application is a continuation-in-part of prior copending and now abandoned application Ser. No. 404,160 filed Aug. 2, 1982, incorporated herein by reference.

BACKGROUND OF THE INVENTION

Gaseous waste products resulting from the burning or combustion of hydrocarbonaceous fuels, such as gasoline and fuel oils, comprise carbon monoxide, hydrocarbons and oxides of nitrogen as products of combustion or incomplete combustion and pose a serious health problem with respect to pollution of the atmosphere. While exhaust gases from other hydrocarbonaceous fuel burning sources such as stationary engines, industrial furnaces, etc., contribute substantially to the air pollution problem, the exhaust gases of automobile internal combustion engines are a principal source of pollution. In recent years, with the increasing number of automobiles, the discharge of waste products therefrom has caused considerable alarm, particularly in urban areas, and the control thereof has become exceedingly important.

Of the various methods which have been proposed, the incorporation of a catalytic converter in the exhaust system holds the most promise of meeting the increasingly rigid standards established by government health agencies. A wide variety of metals and metal oxides, either alone or in combination and supported on a refractory porous carrier material, have been recognized for their ability to catalyze the conversion of carbon monoxide and hydrocarbons.

INFORMATION DISCLOSURE

Catalytic composites comprising rhodium and platinum and/or palladium as the catalytic components have heretofore been proposed for the catalytic conversion of exhaust gases from an internal combustion engine. Frequently, the catalytic composite will further comprise a base metal component, typically nickel. Certain of the base metals are known to catalyze one or more of the various reactions which constitute the exhaust gas conversion process. Also, certain base metals demonstrate sharply decreased performance in the presence of sulfur. Other base metal components, although catalytically inert, are included in the catalytic composite for their contribution to physical and/or thermal stability (see U.S. Pat. Nos. 4,053,556; 3,140,148; 4,153,579; 4,171,289; and U.K. Pat. No. 1,405,405).

In recent years, most exhaust gas conversion catalysts have employed platinum and rhodium and/or palladium. Since the above-mentioned noble metal components are relatively expensive, the component loading used in exhaust gas catalysts is the minimum necessary to effect the statutorily prescribed conversion of the noxious waste gas products. Further, as the reactions taking place in the converter are highly mass-transfer-limited after the internal combustion engine reaches operating temperature, the most effective use of the noble metal group catalytic component is to confine the same in a relatively thin layer at the outside surface of the catalyst support. The mass-transfer limitations arise from the extremely high superficial velocities of the exhaust gas stream prevailing in the converter which velocities preclude contact between the exhaust stream and the metal catalyst other than that which is dispersed on the peripheral surface of the support. In the manufacture of an exhaust gas conversion catalyst comprising a porous refractory inorganic oxide support, it is therefore desirable to effect a distribution of substantially all of the catalytically active metallic component on the peripheral surface of the support whereby full utilization of the component is realized.

U.S. Pat. No. 3,799,887, Brennan, teaches a method of peripheral surface deposition of the catalytic metallic components upon the carrier material. The subject method involves the steps of impregnating a refractory inorganic oxide porous carrier with a polymerizable hydrocarbon, washing the surface of the carrier substantially free of the hydrocarbon, effecting polymerization of the hydrocarbon in the carrier, and impregnation of the carrier material with a thermally decomposable precursor compound of the catalytic metallic component. The polymer within the carrier precluded incorporation of the precursor compound other than at the surface. Thereafter, thermal decomposition of the precursor is effected in an inert atmosphere.

Another surface impregnation technique is disclosed in U.S. Pat. No. 3,259,589, Michalko.

The alkali metals of Group IA of the Periodic Table of the Elements have also been employed in exhaust gas catalysts. In particular, U.S. Pat. No. 3,839,224, Yonehara et al., discloses an oxidation catalyst comprising an inert refractory support, with alumina deposited on the support and at least one heavy metal oxide deposited on the alumina. The support utilized in that reference is selected from the group consisting of cordierite, alumino-silicates containing lithium, mullite and silicon carbide. U.S. Pat. No. 4,089,810, Diwell et al., likewise discloses an automotive exhaust gas catalyst containing alkali metals. Specifically, the catalyst thereof comprises a catalytically active mixed oxide containing ruthenium selected from the group consisting of oxides of the pyrochlore type $A_2B_2O_7$, the perovskite type $ABO_3$, the ilmenite type $B_2O_3$ and the spinel type $AB_2O_4$ wherein A represents one or more of the cations derived from the group consisting of NA, K, Ca, Sr, Ba, Ag, Cd, Hg, Pb, Bi, Y and rare earths; B represents $Ru^{4+}$ and at least one other cation from the group consisting of: Li, Mg, Cr, Nb, Pd, As, Au, Ga, In, Ln, Rh, Sb, Sc, Ir, Os, Pt, Re, Ta, Fe, and Co.

Yet another automotive exhaust gas catalyst containing alkali metals is described in U.S. Pat. No. 4,140,749, Baresel et al. The catalyst of that reference contains a solid solution of $Fe_2O_3$, $Cr_2O_3$, $Fe_3O_4$ and at least one oxide selected from the group consisting of barium oxide, potassium oxide, and lithium oxide.

U.S. Pat. No. 3,928,238 to Koberstein et al., discloses the stabilization of creep resistance of the phases of heavy metal oxides or their compounds by the introduction of alkali or alkaline earth metals in an exhaust gas purification catalyst. The alkali or alkaline earth metals are introduced via a doping procedure wherein the active component heavy metal oxides and the alkali or alkaline earth metals are simultaneously applied to a carrier materials.

In U.S. Pat. No. 3,931,050, Asano et al., lithium oxide is employed as an exhaust gas-permeable layer which layer is deposited upon a layer of active refractory metallic oxide containing a small amount of a catalytic metal.

Basic materials, i.e. alkali and alkaline earth metals, have been incorporated into exhaust gas catalyst carriers in order to improve the stability or life of the catalyst at the relatively severe oxidation conditions prevailing in an exhaust gas conversion zone. U.S. Pat. No. 3,409,390 to Hoekstra, for instance, teaches the addition of an alkaline earth component selected from the group consisting of calcium, strontium and barium vua impregnation of the catalyst base. It has been observed, however, that such basic materials cause a decrease in the catalytic activity of the catalyst.

Previously mentioned U.S. Pat. No. 4,171,289 discloses platinum and platinum/rhodium-containing catalysts which have been treated with lithium. Specifically, Table III of this reference discloses six such lithium treated catalysts. The amount of lithium on each of the catalysts is disclosed in terms of micromoles per gram of catalyst. The reference, however, only contains sufficient information to calculate the weight percent lithium based on the weight of lithium and the support for two of the six lithium containing catalysts disclosed in Table III. These are Beads D containing 29 $\mu$ moles/g of lithium and comprising platinum and rhenium, and extrudates A containing 65$\mu$ moles/g of lithium and platinum and rhenium. The platinum and rhenium contents of both catalysts are set out in Table II of the reference; however, Table II does not disclose the noble metal content of the other four lithium containing catalysts. Accordingly for catalyst Beads D containing 29 $\mu$moles/g lithium with platinum and rhenium, the amount of lithium is about 0.02 wt. % based on the weight of lithium and the weight of the support (not including the noble metals), and for extrudate A containing 65 $\mu$moles/g of lithium with platinum and rhenium, the amount of lithium is about 0.045 wt. % based on the weight of lithium and the weight of the support (not including the noble metals). Additionally, Table III would seem to indicate that the catalysts disclosed therein were first impregnated with noble metals and then treated with lithium. Thus, the lithium treatment is subsequent to the supports compositing with noble metal.

It has now, surprisingly, been discovered that the addition of one alkali metal, in particular, lithium, in a limited amount to a porous refractory inorganic oxide prior to incorporation of the catalytically active metallic components results in not only a desirable peripheral surface layer of catalytically active metal components, but also the improvement of the stability or life of the oxidation catalyst without sacrifice of high activity. Other alkali metals when used to impregnate porous refractory inorganic oxides prior to the impregnation of the catalytic metallic components have enabled similar peripheral surface deposition of the catalytic components, but only lithium has not resulted in a decrease in activity of the final catalytic composite. Furthermore, we have discovered that the lithium must be introduced to the porous refractory inorganic oxide in a prescribed limited amount to avoid a decrease in the activity of the final catalytic composite.

SUMMARY OF THE INVENTION

The present invention relates to a method of preparing an exhaust gas oxidation catalyst. In accord with the invention a method for preparing a more active oxidation catalyst containing a peripheral surface deposition of catalytic metals upon a carrier material has been discovered.

Thus, in one of its broad aspects, the present invention embodies a method for preparing a catalytic composite, which method includes the step of impregnating a refractory inorganic oxide porous carrier material with a catalytically active metallic component selected from the group consisting of platinum, palladium and rhodium whereby said component is dispersed on the peripheral surface of said carrier material, the improvement which comprises, prior to said impregnation of said catalytically active metallic component (a) impregnating said refractory inorganic oxide porous carrier material with an aqueous solution of a lithium salt of an organic acid such that said carrier material contains from 0.1 to 0.8 wt. % Li on an elemental basis, (b) drying said carrier material, and (c) calcining said carrier material.

In another aspect the invention embodies a novel catalytic composite prepared by the method including the step of impregnating a refractory inorganic oxide porous carrier material with a catalytically active metallic component selected from the group consisting of platinum, palladium and rhodium whereby said component is dispersed on the peripheral surface of said carrier material the improvement which comprises, prior to said impregnation of said catalytically active metallic component (a) impregnating said refractory inorganic oxide porous carrier material with an aqueous solution of a lithium salt of an organic acid such that said carrier material contains from 0.1 to 0.8 wt. % Li on an elemental basis, (b) drying said carrier material, and (c) calcining said carrier material.

In still another aspect the invention embodies a novel process for the oxidation of a gas comprising carbon monoxide or a hydrocarbon which comprises contacting said gas at a temperature above 200° C. with a catalytic composite prepared by a method which includes the step of impregnating a refractory inorganic oxide porous carrier material with a catalytically active metallic component selected from the group consisting of platinum, palladium and rhodium whereby said component is dispersed on the peripheral surface of said carrier material the improvement which comprises, prior to said impregnation of said catalytically active metallic component (a) impregnating said refractory inorganic oxide porous carrier material with an aqueous solution of a lithium salt of an organic acid such that said carrier material contains from 0.1 to 0.8 wt. % Li on an elemental basis, (b) drying said carrier material, and (c) calcining said carrier material.

Other embodiments of the present invention relate to details of the subject method of manufacture and will become apparent in the following discussion.

DESCRIPTION OF THE INVENTION

In accordance with the method of the present invention, a more active exhaust gas oxidation catalyst is prepared wherein the so prepared catalyst contains a peripheral surface deposition of the catalytically active metallic components.

Initially, a porous refractory inorganic oxide is impregnated with an aqueous solution of a lithium salt. It is an essential feature of the present invention that the carrier material be impregnated with a lithium salt of an organic acid prior to the impregnation of the carrier with catalytically active components. The sequence of the impregnation steps in the instant invention is important in order to achieve the desirable surface deposition of the catalytically active components. This practice is in contradistinction to the teachings of U.S. Pat. No. 3,928,238 wherein the alkali or alkaline earth metals and the catalytically active components are applied simultaneously to the carrier material, or U.S. Pat. No. 4,171,289 in which the lithium appears to be added subsequent to the platinum and platinum/rhodium components. In the present invention, the preferred salt is lithium acetate. The impregnation may be effected by either soaking, dipping, immersion, or otherwise. For example, the lithium can be added to the refractory inorganic oxide by commingling the latter with an aqueous solution of the lithium acetate. The lithium is added in an amount such that the final carrier material, i.e. lithium plus the inorganic oxide, contains from about 0.1 to about 0.8 wt. % lithium on an elemental basis.

The refractory inorganic oxide employed in the method of the invention should be relatively refractory to the conditions utilized in the method of this invention, and it is intended to include within the scope of the present invention refractory inorganic oxides which have traditionally been utilized in hydrocarbon conversion catalysts, such as: (1) silica or silica gel, clays, and silicates including those synthetically prepared and naturally occurring, which may or may not be acid treated, for example, attapulgus clay, china clay, diatomaceous earth, fuller's earth, kaolin, keiselguhr, etc.; (2) ceramics, porcelain, crushed firebrick, bauxite; (3) synthetic and naturally occurring refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, silicon carbide, boron nitride, etc.; (4) crystalline zeolitic aluminosilicates such as naturally occurring or synthetically prepared mordenite and/or faujasite, either in the hydrogen form or in a form which has been treated with multivalent cations; (5) spinels such as $MgAl_2O_4$, $FeAl_2O_4$, $ZnAl_2O_4$, $MnAl_2O_4$, $CaAl_2O_4$ and other like compounds having the formula $Mo.Al_2O_3$ where M is a metal having a valence of 2; and (6) combinations of elements from one or more of these groups. The preferred refractory inorganic oxide is alumina. Suitable aluminas are the crystalline aluminas known as the gamma-, eta- and theta-alumina, with gamma- or eta-alumina giving best results. In addition, in some embodiments the alumina may contain minor proportions of other well-known refractory inorganic oxides such as silica, zirconia, magnesia, etc. The alumina may be any of the various hydrous aluminum oxides or alumina gels such as boehmite, gibbsite, bayerite, and the like. Activated aluminas, such as have been thermally treated at a temperature in excess of about 400° C. with the elimination of at least a portion of the chemically and/or physically combined water and hydroxyl groups commonly associated therewith, are particularly suitable. The preferred alumina is substantially pure gamma- or eta-alumina.

Preferred refractory inorganic oxides have surface area characteristics such that the average pore diameter is about 20 to about 300 Angstroms, the pore volume is about 0.1 to about 3 cc/g and the surface area is about 25 to about 600 m²/g. The refractory inorganic oxide may or may not be activated prior to use by one or more treatments including drying, calcining, steaming and acid treating. It is preferred that the refractory inorganic oxide be a catalytically active refractory inorganic oxide.

The refractory inorganic oxide used in this invention may advantageously possess any configuration, shape, or size which exposes a catalytically available amount of the metals disposed thereon to the gas to be treated. The choice of configuration, shape and size of the refractory inorganic oxide depends on the particular circumstances in which the invention is to be applied. Generally, in operations where the catalytic composite is disposed as a fixed bed in an immobile vessel, the refractory inorganic oxide may be conveniently employed in particulate form, as pills, pellets, granules, rings, spheres, etc. Particulate form is especially desirable for large volumes of catalytic composite, and for use in circumstances in which periodic replacement of the catalytic composite may be desired. In circumstances in which less mass is desirable or in which movement or agitation of particles of refractory inorganic oxide may result in attrition, dusting, and resulting loss of disposed metals or an undue increase in pressure drop across the particles, a monolithic structure is preferred.

The preferred refractory inorganic oxide, alumina, can be prepared in any suitable manner and may be synthetically prepared or naturally occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, one preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. It is a good practice to subject the calcined particles to a high temperature treatment with steam in order to remove undesired acidic components such as residual chloride. This procedure effects conversion of the alumina hydrogel to the corresponding crystalline gamma-alumina. See the teachings of U.S. Pat. No. 2,620,314 for additional details.

In general, when using particulate refractory inorganic oxide, best results are expected with a gamma-alumina which is used in the form of spherical particles having: a relatively small diameter (i.e., typically about 1/16 inch), an apparent bulk density of about 0.2 to about 0.6 (most preferably about 0.3) g/cc, a pore volume of about 0.4 cc/g, and a surface area of about 150 to about 250 m²/g.

In automobile exhaust gas applications and in other applications where dimensional or structural stability is particularly desired, a monolithic alumina structure is preferred. In preparing a monolithic structure of the refractory inorganic oxide it is usually most convenient to employ the refractory inorganic oxide disposed as a thin film on an inert support material which provides the structural support for the refractory inorganic oxide. The support material can be any refractory material. It is preferred that the support material be unreactive with the refractory inorganic oxide and with the gas to which it is exposed. Ceramic materials are a preferred class of support material. Examples of suitable ceramic materials include: sillimanite, petalite, cordierite, mullite, zircon, zircon mullite, spodumene, alumina-titanate etc. The support material can best be utilized in any rigid, unitary configuration which provides a plurality of pores or channels therethrough extending in the direction of gas flow. It is preferred that the support material be in a honeycomb configuration. The support material can be used advantageously in either unitary form, or as an arrangement of multiple modules. The support material can be oriented such that gas flow is generally in the same direction as the cells or channels of the carrier material, or the gas can flow through the carrier material in a transverse or radial manner. For a more detailed discussion of monolithic structures, refer to U.S. Pat. No. 3,785,998 and U.S. Pat. No. 3,767,453, incorporated herein by reference.

The surface area of the support material is not critical to the method of this invention. It is preferred that the micropore volume of the support material be relatively low, and it is especially preferred that the support material have a macropore distribution such that at least about 90% of the pore volume is in pores having a diameter of greater than about 2000 Å. The surface area of the monolithic structure, as opposed to the support material of which the structure is made, should be maximized consistent with pressure drop limitations in the particular embodiment of the method of this invention selected. It is preferred that the surface area of the monolithic structure be from about 50 to about 1000 square meters per liter of structure, as measured by $N_2$ adsorption, where the volume of the structure is measured by its exterior dimensions. The geometric surface area of the monolithic structure, in term of cell density, should be maximized consistent with pressure drop limitations, and is preferably in the range of from about 200 to about 800 cells per square inch of cross sectional area of the structure.

The refractory inorganic oxide can be deposited on the support material by any conventional or convenient means. It is preferred that the refractory inorganic oxide deposit be in the form of a film of from about 20 to about 254 microns thick. It is also preferred that the refractory inorganic oxide be present on the support material in amount in the range of from about 800 gms per cubic foot of carrier to about 4500 gms per cubic foot of carrier, where the volume is measured by the exterior dimensions of the carrier material.

After the porous refractory inorganic oxide has been impregnated with the lithium salt the carrier is dried and calcined. The drying is effected at 100° to 300° C. The calcination is effected suitably in air at from 370° to 650° C. for a period of from 1 to 20 hours. The calcination step is followed by the incorporation into the lithium impregnated carrier of the catalytic components.

The catalytic components can be incorporated in the catalytic composite in any suitable manner on the refractory inorganic oxide, such as by ion-exchange, or impregnation by soaking, dipping, immersion, or otherwise. The preferred method of preparing the catalyst involves the utilization of a soluble, decomposable compound of the particular catalytic component to impregnate the refractory inorganic oxide in a relatively uniform manner. For example, the platinum and/or palladium component may be added to the refractory inorganic oxide by commingling the latter with an aqueous solution of chloroplatinic and/or chloropalladic acid. The chloroplatinic acid and chloropalladic acid can be in common aqueous solution, or in separate aqueous solutions. In the latter case, in instances in which both a platinum and a palladium component are designed, the commingling of the refractory inorganic oxide with the solutions can be performed sequentially in any order. Other water-soluble compounds or complexes may be employed in impregnation solutions and include ammonium chloroplatinate, bromoplatinic acid, platinum trichloride, platinum tetrachloride hydrate, dinitrodiaminoplatinum, palladium chloride, palladium nitrate and tetraamminepalladium chloride. Likewise, the rhodium component may be added to the refractory inorganic oxide by commingling the latter with an aqueous solution of rhodium trichloride. Other water-soluble compounds or complexes or rhodium may be employed, such as hexamminerhodium chloride, rhodium trichloride hydrate and rhodium nitrate. The utilization of a platinum, rhodium, or palladium chloride compound, such as chloroplatinic or chloropalladic acid or rhodium trichloride hydrate, is ordinarily preferred.

The resulting catalytic composite contains the catalytic metallic components in a thin (less than 20 microns) peripheral surface layer.

The catalytic composite of this invention is suitable for use in a converter or a reactor of through-flow, cross-flow, or radial-flow design installed in the exhaust line of an internal combustion engine.

The following example is presented as an illustration of the instant invention and is not intended as an undue limitation on the generally broad scope of the invention as set out in the appended claims.

EXAMPLE

Catalyst Samples 1 through 7 were prepared substantially according to the procedure elucidated below. Fifty ml quantities of alumina in the form of ⅛ inch spheres were placed in a vacuum flask and evacuated. Two hundred fifty ml of aqueous alkali/alkaline earth acetate impregnating solution was contacted with each alumina sample, and the excess solution was separated. The alkali/alkaline earth acetate content of each impregnating solution was calculated such that each finished catalyst composition possessed the desired quantity of alkali/alkaline earth metal after the impregnation step. A similar impregnation procedure was employed to incorporate 0.13 wt. % Pt into each of the seven samples and an additional fifty ml quantity of ⅛ inch alumina spheres designated Sample 8, utilizing an aqueous solution of chloroplatinic acid as the impregnating solution. The appended Table shows the amounts of alkali/alkaline earth metal incorporated into each sample. As indicated, Sample 8 contains no alkali/alkaline earth metal but only 0.13 wt % Pt. Samples 2 and 4 were prepared in accordance with the invention.

The amounts of Na, K, and Mg incorporated into Samples 5, 6, and 7 were calculated to be the molar equivalent of 0.1 wt. % Li as used in Sample 4.

In each case both after the alkali/alkaline earth metal impregnation and after the platinum impregnation the composite was dried at 150° C. and calcined at 538° C.

Each of the samples was evaluated as an oxidation catalyst for propane and carbon monoxide at the high space velocity characteristic of automobile exhaust gas flowing through a converter.

The following Table shows that the incorporation of lithium into the catalyst carrier in a limited amount (Samples 2 and 4) results in an increase in the percent propane conversion at 1000° F., and an increase in the percent CO conversion at 550° F. relative to catalyst Sample 8 containing no alkali/alkaline earth metal, merely 0.13 wt. % platinum. Relative to Sample 8, Sample 2 exhibited a 25° F. decrease in the temperature required to convert 50% of the CO while Sample 4 exhibited a 10° F. increase in the temperature required to convert 50% of the CO. Notwithstanding the 10° F. increase, Sample 4 exhibited a higher percentage of propane conversion at 1000° F. and CO conversion at 550° F. relative to Sample 8 thereby demonstrating the advantages of the invention. Moreover, the Table discloses that where lithium was added in an amount less than or greater than the range prescribed in the instant invention (Samples 1 and 3), there resulted an overall decrease in the percent propane conversion at 1000° F., and an increase in the temperature required to convert 50% of the CO relative to Sample 8 which merely contains platinum and no alkali/alkaline earth metals. Comparison of the performance of the catalysts of the invention (Samples 2 and 4) to Samples 5, 6, and 7 using metals other than lithium demonstrates the advantage of lithium over the other alkali/alkaline earth metals.

EVALUATION OF ⅛" SPHERICAL ALUMINA CATALYSTS WITH 0.13% Pt AT 120,000 G.H.S.V.

| Sample | Additive | % Propane Conversion at 1000° F. | °F. for 50% CO Conversion | % CO Conversion at 550° F. |
|---|---|---|---|---|
| 1 | .05% Li | 48.9 | 445 | 87.4 |
| 2 | 0.4% Li | 56.4 | 405 | 93.7 |
| 3 | 1.5% Li | 30.3 | 468 | 87.2 |
| 4 | 0.1% Li | 57.8 | 440 | 90.6 |
| 5 | 0.33% Na | 43.3 | 415 | 81.8 |
| 6 | 0.51% K | 39.7 | 403 | 87.4 |
| 7 | 0.35% Mg | 48.3 | 448 | 87.9 |
| 8 | — | 53.7 | 430 | 86.1 |

Additionally, the practice of a lithium addition in accordance with the invention (Samples 2 and 4) yielded a catalyst which contained the platinum in the desirable thin peripheral surface layer, less than 20 microns in depth. Inspection of the catalytic composites after their preparation showed that the practice of sodium and potassium incorporation (Samples 5 and 6) yielded a final composite which also contained the platinum in a thin surface layer, however, incorporation of these alkali metals did not yield catalysts of comparable performance to the catalysts of the invention (Samples 2 and 4). Likewise, catalyst Samples 1 and 3 while possessing thin peripheral surface layers of platinum did not demonstrate catalytic performance comparable to Samples 2 and 4. The magnesium impregnated catalytic composite (Sample 7) resulted in an undesirable diffuse band of platinum deposition characteristic of a platinum impregnation of a barium stabilized support. The platinum impregnation of catalyst Sample 8 also resulted in an undesirable diffuse band of platinum and not the thin peripheral layer of Samples 2 and 4.

In any event, only the lithium impregnated catalytic composites where the lithium was incorporated in the correct amounts possessed both the increased oxidation activity and achievement of the desirable thin peripheral surface layer of platinum.

What is claimed is:

1. In a method for preparing a catalytic composite which method includes the step of impregnating a refractory inorganic oxide porous carrier material with a catalytically active metallic component selected from the group consisting of platinum, palladium and rhodium whereby said component is dispersed on the peripheral surface of said carrier material, the improvement which comprises, prior to said impregnation of said catalytically active metallic component (a) impregnating said refractory inorganic oxide porous carrier material with an aqueous solution of a lithium salt of an organic acid such that said carrier material contains from 0.1 to 0.8 wt. % Li on an elemental basis, (b) drying said carrier material, and (c) calcining said carrier material.

2. The method of claim 1 wherein said porous carrier material is a high surface area alumina.

3. The method of claim 1 wherein said porous carrier material is deposited as a film on a relatively low surface area honeycomb-type ceramic support.

4. The method of claim 1 wherein said lithium salt is lithium acetate.

5. A catalytic composite prepared by the method including the step of impregnating a refractory inorganic oxide porous carrier material with a catalytically active metallic component selected from the group consisting of platinum, palladium and rhodium whereby said component is dispersed on the peripheral surface of said carrier material the improvement which comprises, prior to said impregnation of said catalytically active metallic component (a) impregnating said refractory inorganic oxide porous carrier material with an aqueous solution of a lithium salt of an organic acid such that said carrier material contains from 0.1 to 0.8 wt. % Li on an elemental basis, (b) drying said carrier material, and (c) calcining said carrier material.

6. The catalytic composite of claim 5 wherein said porous carrier material is a high surface area alumina.

7. The catalytic composite of claim 5 wherein said porous carrier material is deposited as a film on a relatively low surface area honeycomb-type ceramic support.

8. The catalytic composite of claim 5 wherein the lithium salt is lithium acetate.

* * * * *